H. B. LAPP.
FLEXIBLE COUPLING.
APPLICATION FILED NOV. 21, 1913.
1,185,208.
Patented May 30, 1916.
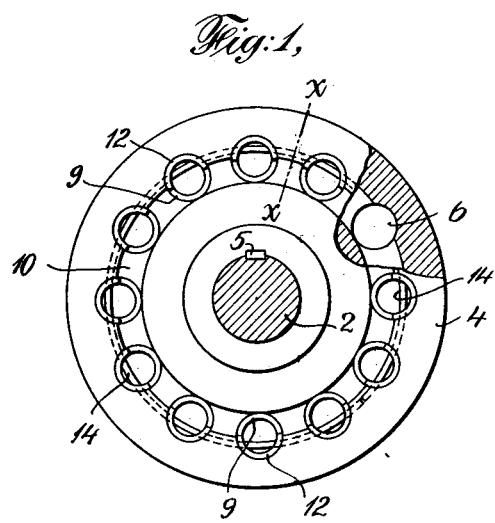
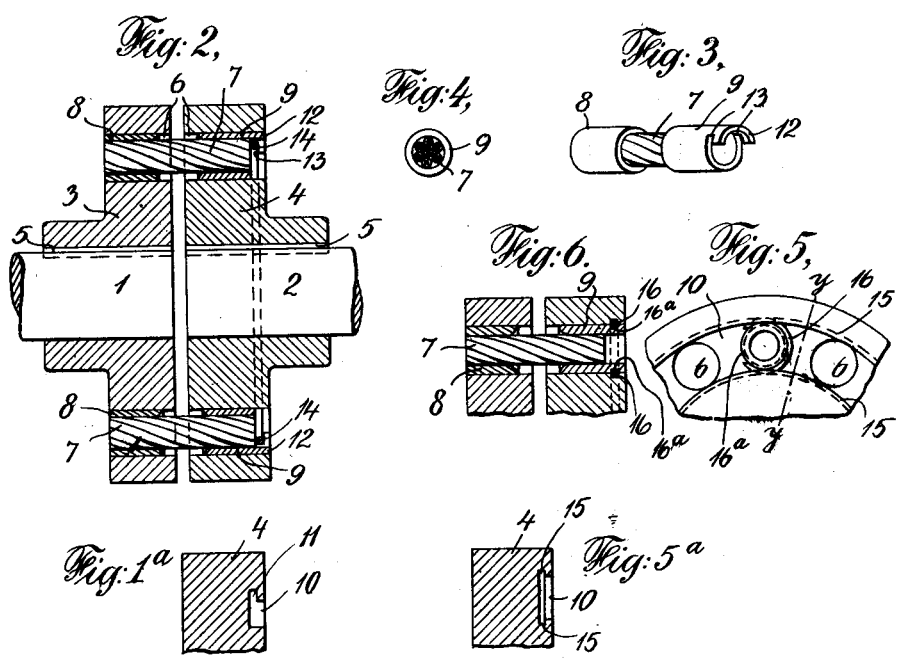
Witnesses:
Inventor
Harry B. Lapp

UNITED STATES PATENT OFFICE.

HARRY B. LAPP, OF TRENTON, NEW JERSEY, ASSIGNOR TO DE LAVAL STEAM TURBINE COMPANY, OF NEW YORK, N. Y., A CORPORATION OF NEW JERSEY.

FLEXIBLE COUPLING.

1,185,208.   Specification of Letters Patent.   Patented May 30, 1916.

Application filed November 21, 1913. Serial No. 802,233.

*To all whom it may concern:*

Be it known that I, HARRY B. LAPP, a citizen of the United States of America, and a resident of Trenton, in the county of Mercer and State of New Jersey, have invented certain new and useful Improvements in Flexible Couplings, of which the following is a specification.

This invention relates to flexible couplings designed to afford a slightly yielding driving connection between rotating shafts, rotating wheels, and other rotating members, i. e., to afford such flexibility that the two members may be slightly out of line or at a slight angle to one another, or both; and the flexible connection herein described also provides such resilience as suffices to absorb, and prevent undue transmission of, sudden shocks.

My invention comprises a coupling member consisting of a short length of wire cable provided at its ends with encircling sleeves whereby stress is applied efficiently to such cable section and whereby the coupling member is held in place, and whereby an efficient sliding bearing is provided between the coupling member and one of the two rotating members between which power is to be transmitted; and also comprises other features as hereinafter set forth.

The objects of my invention are to improve flexible connectors of the type referred to, and to make the same stronger, cheaper, more durable, and more easily manufactured; also to secure such members in place in an improved manner.

I will now proceed to describe my invention with reference to the accompanying drawings, in which a flexible connector embodying my invention is illustrated and the manner of use of such connector is illustrated, and in which two of the many possible means for securing such connector in place are illustrated.

In said drawings, Figure 1 shows a front elevation and partial section of a shaft coupling embodying flexible connectors constructed in accordance with my invention and embodying one of the means hereinafter described for securing such connectors in place. Fig. 1ª is a fragmentary transverse section of one of the coupling disks, illustrating the grooves therein, the section of Fig. 1ª being taken on the line *x—x* of Fig. 1. Fig. 2 shows a section of the shaft coupling shown in Fig. 1. Fig. 3 shows a detail perspective elevation of one of the flexible connectors. Fig. 4 shows an end view of such connector. Fig. 5 shows a fragmentary end elevation of a shaft coupling embodying alternative means for securing the flexible connectors in place. Fig. 5ª is a fragmentary longitudinal section of the disk 4 shown in Fig. 5, the section of Fig. 5ª being taken on the line *y—y* of Fig. 5. Fig. 6 is a fragmentary longitudinal section of the construction shown in Fig. 5.

Referring first to Figs. 1–4 inclusive numerals 1 and 2 designate rotary shafts, of which either may be a driving member and the other a driven member; and numerals 3 and 4 designate coupling disks mounted upon shafts 1 and 2 respectively, and keyed thereto by keys 5 in the ordinary manner. The coupling disks 3 and 4 are provided with corresponding registering holes 6 near their peripheries, such holes being adapted to receive the sleeves of the flexible connectors hereinafter described.

Figs. 3 and 4 show one of the connectors, comprising a short length of wire cable 7 (shown in this instance as a helically wound cable of ordinary construction) provided at its two ends with sleeves or collars 8 and 9, fitting closely over the ends of the said cable-section 7, and so serving to prevent separation of the strands of such cable section, the said sleeves 8 and 9 also fitting closely within the holes 6 of the coupling disks 3 and 4. These sleeves 8 and 9 may have a drive fit on the ends of the cable section 7, or may be brazed thereon or welded thereto. One of the sleeves, 8, preferably has a sliding fit with the hole 6 in which it fits, while the other sleeve, 9, instead of having a similar sliding fit with the hole 6 in which it fits, is preferably held in place within such hole by means such as hereinafter described.

It will be apparent that, owing to the equal flexibility in all transverse directions of the cable section 7, these flexible connectors permit efficient transmission of motion from shaft 1 to shaft 2, or vice versa, even though said shafts be out of line; also, for the same reason, and because sleeves 8 are free to slide in and out in the holes 6 in which such sleeves 8 are seated, rotary motion may be transmitted efficiently from shaft 1 to shaft 2, or vice versa, even though one of such shafts be at a slight angle with reference to the other of said shafts. It will also be apparent that, since there is considerable clearance between the adjacent ends of sleeves 8 and 9, and between the sides of the cable section 7 and the sides of the holes 6, any sudden shocks experienced during transmission of motion from shaft 1 to shaft 2, or vice versa, will be absorbed in large measure by lateral flexing of cable sections 7. In practice, the strands of these cable sections 7 are composed of steel or other metal having considerable resilience, so that the shaft coupling herein described provides a spring-connection between the one shaft and the other.

In the arrangement for holding the connectors in place, illustrated in Figs. 1 and 2, the coupling disk 4 is provided, on its outside face, with a groove 10 of less width than the diameter of the holes 6, and with another groove 11 of greater width than the groove 10, but of less radius than the radial distance from the center of the shaft to the outside of the holes 6; and the sleeves 9 are provided with projecting portions 12 having notches 13 corresponding to the groove 11; and when the several connectors are in place, a spring keying wire 14 is inserted in the groove 11 and in the notches 13, such keying wire holding the sleeves 9 against axial motion.

In the alternative construction illustrated in Figs. 5 and 6, the disk 4 is provided with a groove 10 of about the width of holes 6, and with other grooves 15, and spring collars 16, open on one side and fitting within the grooves 15, and adapted to fit also within other grooves 16ª, in the sleeves 9, are sprung over said sleeves after the connectors have been inserted.

By either of these constructions the flexible connectors are held in place against longitudinal motion with respect to disk 4. But it will be understood that I do not limit myself to any particular means for holding these flexible connectors against longitudinal motion with respect to one of the disks or members between which rotary motion is to be transmitted, nor do I limit myself to the securing of the connectors against longitudinal motion; though in general it is better to secure the connectors against longitudinal motion with reference to one of said disks or rotary members.

I am aware that heretofore various forms of shaft connectors have been employed, some comprising laminated structures consisting of thin flexible metal plates and some comprising rubber or other flexible non-metallic material. It is evident that laminated structures comprising thin metal plates are not equally flexible in all directions, and that lubrication of the laminæ is desirable. It is obvious that structures comprising rubber or other non-metallic material are not durable. So far as I am aware my structures hereinbefore set forth are the first structures wherein motion is transmitted between rotating members by means of flexible connectors comprising short sections of stranded cable arranged non-axially, i. e., set well away from the axis of rotation, and transmitting motion by lateral stress rather than by torsional stress. Flexible shafts composed of stranded cable and transmitting motion by torsional stress are, of course, quite common; but in such flexible shafts the two ends of such shafts are coaxial with the rotary members between which motion is transmitted and motion is transmitted by torsional stress on the flexible cable rather than by lateral stress, as in my construction. Where such flexible shafts are employed, since such shafts are at their ends (and, except for droop, elsewhere) close to the axis of rotation, they are located relatively disadvantageously for the transmission of rotary motion.

I believe it to be essential that, in order that the flexible connectors herein described may transmit motion without undue flexure, the distance between the adjacent ends of the confining sleeves or bushings of each such connector be spaced apart by a distance not greater than four times the diameter of the cable; and preferably such distance is even less, and not more than twice the diameter of the cable.

What I claim is:—

1. A flexible coupling such as described comprising rotary driving and driven members and one or more flexible connectors therebetween, and arranged to transmit rotary motion from one to the other, and each comprising a short length of stranded cable connected at its ends to said driving and driven members and arranged approximately parallel to the axes of said driving and driven members, but well away from the centers of said driving and driven members, power being transmitted from the driving to the driven member through said connectors, by lateral stress on said connector or connectors, said connector or connectors having each a longitudinal sliding connection with one of said driving and driven members.

2. A flexible coupling such as described comprising rotary driving and driven members and one or more flexible connectors therebetween, and arranged to transmit rotary motion from one to the other, and each comprising a short length of stranded cable connected at its ends to said driving and driven members and arranged approximately parallel to the axes of said driving and driven members, but well away from the centers of said driving and driven members, power being transmitted from the driving to the driven member through said connectors, by lateral stress on said connector or connectors, said connector or connectors having each a longitudinal sliding connection with one of said driving and driven members, and being held against longitudinal motion with reference to the other of said driving and driven members.

3. A flexible coupling such as described comprising rotary driving and driven members and one or more flexible connectors therebetween, and arranged to transmit rotary motion from one to the other, and each comprising a short length of stranded cable having at its ends confining sleeves fitting within holes in said driving and driven members which are eccentric to the axes of rotation of said driving and driven members, power being transmitted from the driving to the driven member through said connector by lateral stress on said connector or connectors, one of the confining sleeves of each such connectors having a sliding connection with one of said driving and driven members.

4. A flexible coupling such as described comprising rotary driving and driven members and one or more flexible connectors therebetween, and arranged to transmit rotary motion from one to the other, and each comprising a short length of stranded cable having at its ends confining sleeves fitting within holes in said driving and driven members which are eccentric to the axes of rotation of said driving and driven members, power being transmitted from the driving to the driven member through said connector by lateral stress on said connector or connectors, one of the confining sleeves of each such connectors having a sliding connection with one of said driving and driven members, the other confining sleeve of each such connector or connectors being held against longitudinal motion with respect to the other of said driving and driven members.

5. A flexible coupling such as described comprising rotary driving and driven members and one or more flexible connectors therebetween, and arranged to transmit rotary motion from one to the other, and each comprising a short length of stranded cable provided at its ends with confining sleeves, the adjacent ends of said confining sleeves being spaced apart, said sleeves fitting within eccentric apertures in said driving and driven members, the said apertures of greater diameter than the diameter of said stranded cable whereby space is provided for lateral play of said cable connector or connectors.

In testimony whereof I have signed this specification in the presence of two subscribing witnesses.

HARRY B. LAPP.

Witnesses:
C. P. WALLER,
HENRY J. HANGLIK.